United States Patent [19]

Matsuo et al.

[11] 4,452,966

[45] Jun. 5, 1984

[54] PROCESS FOR THE PRODUCTION OF POLYCARBONATE

[75] Inventors: Shigeru Matsuo; Masaaki Itoi, both of Sodegaura, Japan

[73] Assignee: Idemitsu Kosan Company Limited, Tokyo, Japan

[21] Appl. No.: 482,326

[22] Filed: Apr. 5, 1983

[30] Foreign Application Priority Data

Apr. 26, 1982 [JP] Japan .................................. 57-68582

[51] Int. Cl.[3] ............................................ C08G 63/62
[52] U.S. Cl. ..................................... 528/174; 525/461;
525/462; 525/465; 525/466; 525/467; 525/468;
525/469; 525/470; 528/125; 528/126; 528/128;
528/173; 528/176; 528/182; 528/196; 528/198;
528/199; 528/203; 528/204; 528/370; 528/371
[58] Field of Search .............. 528/173, 174, 176, 182,
528/125, 126, 128, 196, 198, 199, 203, 204,
370–371; 525/461, 462, 465–470

[56] References Cited

U.S. PATENT DOCUMENTS

| | | | |
|---|---|---|---|
| 3,816,373 | 6/1974 | Hoogeboom | 528/176 |
| 4,001,184 | 1/1977 | Scott | 528/176 |
| 4,294,953 | 10/1981 | Quinn et al. | 528/173 |

*Primary Examiner*—Lester L. Lee
*Attorney, Agent, or Firm*—Frishauf, Holtz, Goodman & Woodward

[57] ABSTRACT

A process for producing polycarbonate is described, comprising reacting a chloroformate group-containing polycarbonate oligomer with an aqueous alkaline solution of a compound containing at least three functional groups and, thereafter, interfacial polycondensing the above-obtained reaction product with an aqueous alkaline solution of a dihydric phenol compound. The thus-produced polycarbonate has good melt characteristics compared with conventional polycarbonates, and the dependence of melt viscosity on a rate of shear is large. Thus, the polycarbonate of the invention is suitable for extrusion molding, particularly for blow molding using an extrusion molding machine, and can provide good quality sheets or molds.

10 Claims, No Drawings

PROCESS FOR THE PRODUCTION OF POLYCARBONATE

FIELD OF THE INVENTION

The present invention relates to a process for producing polycarbonate.

BACKGROUND OF THE INVENTION

A polycarbonate resin has excellent characteristics such as strength, impact resistance, transparency, etc. and is widely used as an engineering resin in the production of, e.g., electrical parts, mechanical parts, and containers.

The usual linear polycarbonate resin, however, has the features that, when melted, it behaves nearly as a Newtonian liquid and its apparent viscosity does not depend on a rate of shear, and furthermore, its melt elasticity and melt strength are poor. For this reason, in extrusion molding of polycarbonate, particularly blow molding using an extrusion molding machine, it is difficult to produce a stable and large-sized parison.

As methods of improving the above-described disadvantages of polycarbonate, a method of mixing two types of polycarbonate having significantly different molecular weights and a method of branching polycarbonate are known. The latter branched polycarbonate-producing method includes (1) a method of blowing phosgene into dihydric phenols and polyfunctional compounds (see Japanese Patent Publication No. 17149/1969, and (2) a method of effecting the procedure of the method (1) above in the presence of monophenols (see Japanese Patent Publication No. 23918/1972). These methods, however, are not preferred because the polyfunctional compounds are of low reactivity. Thus, there have been proposed (3) a method in which polycarbonate oligomers having a degree of polymerization of from 5 to 15 are prepared and, thereafter, reacted by the addition of a catalyst and polyphenol (see Japanese Patent Publication No. 28193/1978), and (4) a method in which the first-half step of blowing phosgene in the method (2) as described above is performed under the condition that the pH is adjusted to from 3 to 6 (see Japanese Patent Application Laid-Open No. 129493/1976). These methods, however have, various disadvantages; in the method (3), it is difficult to control the process so that the reaction of the added polyphenol is completed, and in the method (4), the dihydric phenol easily precipitates (or deposits) and, therefore, the equipment that can be used is limited and a tubular reactor cannot be used.

SUMMARY OF THE INVENTION

An object of the invention is to provide a process for producing polycarbonate which is free from the above-described disadvantages.

The present invention relates to a process for producing polycarbonate which comprises reacting a polycarbonate oligomer containing a chloroformate group with an aqueous alkaline solution of a compound containing at least three functional groups and, thereafter, interfacial polycondensing the above-prepared reaction product with an aqueous alkaline solution of a dihydric phenol compound.

DETAILED DESCRIPTION OF THE INVENTION

The chloroformate group-containing polycarbonate oligomer as used herein is prepared by adding an organic solvent to an aqueous alkaline solution of dihydric phenol, and blowing phosgene into the resulting solution.

These dihydric phenol compounds are usually those represented by the following formulae (I) and (II):

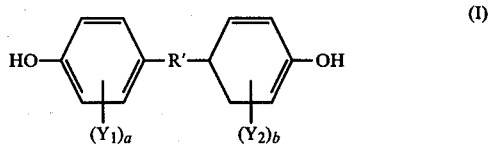

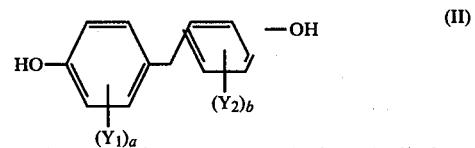

(wherein R' is a substituted or unsubstituted alkylene group containing from 1 to 5 carbon atoms, —O—, —S—, —SO$_2$—, or —CO—, Y$_1$ and Y$_2$ are each a hydrogen atom or a halogen atom, and a and b are each an integer of from 1 to 4).

Typical examples of the diphenol compounds represented by the general formula (I) or (II) are shown below:

4,4'-Dihydroxydiphenyl, 2,2-bis(4-hydroxyphenyl)-propane (bisphenol A), 2,4-bis(4-hydroxyphenyl)-2-methylbutane, 1,1-bis(4-hydroxyphenyl)-cyclohexane, α,α'-bis(4-hydroxyphenyl)-p-diisopropylbenzene, 2,2-bis(3-methyl-4-hydroxyphenyl)-propane, 2,2-bis(3-chloro-4-hydroxyphenyl)-propane, bis(3,5-dimethyl-4-hydroxyphenyl)-methane, 2,2-bis(3,5-dimethyl-4-hydroxyphenyl)-propane, bis(4-hydroxyphenyl) sulfone, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-cyclohexane, α,α'-bis-(3,5-dimethyl-4-hydroxyphenyl)-p-diisopropylbenzene, 2,2-bis(3,5-dichloro-4-hydroxyphenyl)-propane, and 2,2-bis-(3,5-dibromo-4-hydroxyphenyl)-propane. Particularly preferred diphenol compounds are 2,2-bis(4-hydroxyphenyl)-propane, 2,2-bis(3,5-dimethyl-4-hydroxyphenyl)-propane, 2,2-bis(3,5-dichloro-4-hydroxyphenyl)-propane, 2,2-bis(3,5-dibromo-4-hydroxyphenyl)-propane, and 1,1-bis(4-hydroxyphenyl)-cyclohexane. These dihydric phenol compounds can be used alone or in combination with each other.

Polycarbonate oligomers resulting from the reaction between the above-described dihydric phenol compound and phosgene include copolymers as well as homopolymers.

The degree of polymerization of polycarbonate oligomer, i.e., the molecular weight of polycarbonate oligomer, can be adjusted to the desired level by adding monohydric phenols such as phenol, p-tert-butylphenol, isopropylphenol, etc. as molecular weight modifiers. The degree of polymerization is usually 20 or less and preferably from about 2 to about 10.

Compounds containing at least three functional groups which can be used in the invention are those compounds containing at least three functional groups such as hydroxyl group, carboxyl group, amino group, imino group, forml group, and acid halide group in the molecule thereof. Typical examples of such compounds include mellitic acid, trimellitic acid, trimellitic acid chloride, trimellitic acid anhydride, pyromellitic acid, resorcylic acid, resorcinaldehyde, trimellitiltrichloride, trihydroxyflavan derivatives (e.g. 2,4,4-trimethyl-2',4'-7-trihydroxyflavan), phloroglucin, 2,6-dimethyl-2,4,6-tris-(4'-oxyphenol)hepta-3-ene, etc.

In reacting chloroformate group-containing polycarbonate oligomer with the compound containing at least three functional groups, tertiaryamines such as triethylamine, tripropylamine, and the like can be used as a catalyst. In addition, a part of an aqueous alkaline solution of a dihydric phenol compound as described hereinafter may be added in such an amount that the polycondensation reaction is not completed.

Conditions under which the reaction between the chloroformate group-containing polycarbonate oligomer and the compound containing at least three functional groups is performed are not critical. In general, the reaction is carried out at a temperature of from 2° to 40° C., preferably from 5° to 35° C. for a period of from 10 minutes to 3 hours, preferably from 20 minutes to 2 hours while stirring.

The thus-obtained reaction product is then interfacial polycondensated with an aqueous alkaline solution of a dihydric phenol compound. The dihydric phenol compound as used herein includes the diphenol compounds represented by the general formula (I) or (II) as described hereinbefore. Typical examples are the same ones as described hereinbefore.

In performing the interfacial polycondensation reaction, a copolymerization component, e.g. polyester, a catalyst, e.g., triethylamine, tripropylamine, and the like can be added. This reaction is usually performed with stirring at a temperature of from 2° to 40° C., preferably from 5° to 35° C. for a period of from 10 minutes to 6 hours, preferably from 20 minutes to 4 hours. The reaction is completed to obtain the desired branched polycarbonate.

In the process of the invention, since there is no competitive reaction between the compound containing at least three functional groups and the dihydric phenol compound, the reactivity is very high. Compared with conventional polycarbonates, the polycarbonate produced by the process of the invention has good melt characteristics, and the dependence of melt viscosity on a rate of shear is large. Among the advantages of the polycarbonate of the invention are a great Barus effect and a small draw-down. Another advantage is that the stress crack resistance of the polycarbonate is excellent.

Accordingly, the polycarbonate produced by the process of the invention is suitable for extrusion molding, particularly for blow molding using an extrusion molding machine, and provides high quality sheets or molds.

The present invention is explained in greater detail by reference to the following Examples and Reference Example.

EXAMPLES 1 TO 4

A mixture of 650 milliliters of a methylene chloride solution (concentration, 170 grams per liter) of polycarbonate oligomers (number average molecular weight, 550) prepared from p-tert-butylphenol, bisphenol A, and phosgene, 13 milliliters of a 4 normal (N) aqueous caustic soda solution containing a predetermined amount of $\beta$-resorcylic acid, and 50 milligrams of triethylamine was placed in a 1-liter reaction vessel with a baffle provided therein, and it was then reacted with stirring at 400 revolutions per minute (rpm) for 50 minutes. Then, 300 milliliters of the above-obtained reaction mixture, 150 milliliters of methylene chloride, 150 milliliters of a 2 N aqueous caustic soda solution containing 15.8 grams of bisphenol A, 25 milliliters of triethylamine, and 2.7 milliliters of a 65% aqueous caustic soda solution were placed in a 1-liter reaction vessel provided with a baffle, and stirred at 30° C. for 50 minutes at 400 rpm.

After the reaction was completed, the reaction mixture was diluted with 1,000 milliliters of methylene chloride, and 1,500 milliliters of water was added. The resulting mixture was stirred. Thereafter, an aqueous layer was separated, and the remaining mixture was washed with a 0.01 N aqueous caustic soda solution, water, a 0.01 N aqueous hydrochloric acid solution, and water in this order. Then, an organic layer was separated, and the methylene chloride was distilled away to obtain polycarbonate in a powder form.

The properties and melt characteristics of the above-produced polycarbonate are shown in Table 1.

EXAMPLES 5 AND 6

A mixture of 450 milliliters of a methylene chloride solution (concentration, 170 grams per liter) of polycarbonate oligomers (number average molecular weight, 550) prepared from p-tert-butylphenol, bisphenol A, and phosgene, 50 ml of a 2 N aqueous caustic soda solution containing a predetermined amount of $\beta$-resorcylic acid, and 25 milligrams of triethylamine was placed in a 1-liter reaction vessel with a baffle provided therein, and it was then reacted while stirring at 400 rpm for 50 minutes. Then, 100 milliliters of a 2 N aqueous caustic soda solution of bisphenol A, 25 milligrams of triethylamine, and 7.3 milliliters of a 65% aqueous caustic soda solution were added, and the resulting mixture was stirred at 400 rpm at 28° C. for 50 minutes.

After the reaction was completed, the procedure of Example 1 was repeated to obtain polycarbonate powder.

The properties and melt characteristics of the above-produced polycarbonate are shown in Table 1.

EXAMPLE 7

The procedure of Example 5 was repeated with the exception that 2,4,4-trimethyl-2',4',7-trihydroxyflavan was used in place of $\beta$-resorcylic acid.

The results are shown in Table 1.

EXAMPLE 8

The procedure of Example 5 was repeated with the exception that phloroglucin was used in place of $\beta$-resorcylic acid.

The results are shown in Table 1.

EXAMPLE 9

The procedure of Example 5 was repeated with the exception that 2,6-dimethyl-2,4,6-tris(4'-oxyphenol)-hepta-3-ene was used in place of $\beta$-resorcylic acid.

The results are shown in Table 1.

REFERENCE EXAMPLE

The procedure of Example 5 was repeated with the exception that $\beta$-resorcylic acid was not added.

The properties and melt characteristics of the thus-produced polycarbonate are shown in Table 1.

TABLE 1

| Example | Amount of Branching Agent (parts by weight per 100 parts by weight of oligomer) | Reduced Viscosity[1] | MIR[2] | Swell Ratio[3] |
|---|---|---|---|---|
| 1 | 0.6 | 0.78 | 77 | 2.22 |
| 2 | 0.8 | 0.68 | 60 | 2.32 |
| 3 | 1.0 | 0.64 | 62 | 2.53 |
| 4 | 1.2 | 0.59 | 69 | 3.32 |
| 5 | 0.5 | 0.72 | 55 | 2.00 |
| 6 | 0.8 | 0.81 | 60 | 2.40 |
| 7 | 0.78 | 0.82 | 56 | 2.50 |
| 8 | 2.50 | 0.74 | 97 | 2.70 |
| 9 | 0.6 | 0.58 | 62 | 2.37 |
| Reference Example | — | 0.67 | 34 | 1.14 |

[1] 0.5 gram per 100 milliliters, methylene chloride, 20° C.
[2] Melt index ratio ($MI_{11}$ kg/$MI_{325}$ g), 280° C.
[3] Value obtained by dividing the cross sectional area of a strand extruded when a load of 11 kilograms was applied on a molten resin in measuring the melt index, by the cross sectional area of an orifice.

What is claimed is:

1. A process for producing polycarbonate which comprises reacting a chloroformate group-containing polycarbonate oligomer with an aqueous alkaline solution containing a compound having at least three functional groups selected from the group consisting of a hydroxyl group, a carboxyl group, an amino group, an imino group, a formyl group and an acid halide group to thereby obtain a reaction product, and interfacial polycondensing said reaction product with an aqueous alkaline solution containing a dihydric phenol compound, said chloroformate group-containing polycarbonate oligomer being prepared by the reaction of at least one dihydric phenol compound represented by formula (I) or (II) with phosgene,

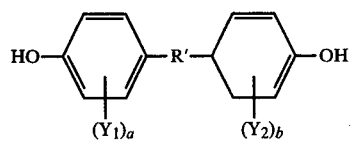
(I)

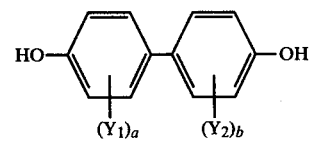
(II)

wherein R' is selected from the group consisting of an alkylene group having from 1 to 5 carbon atoms, —O—, —S—, —$SO_2$—, and —CO—; $Y_1$ and $Y_2$ are each selected from the group consisting of a hydrogen atom and a halogen atom; and a and b are each an integer of from 1 to 4.

2. The process of claim 1, wherein the degree of polymerization of the chloroformate group-containing polycarbonate oligomer is no more than 20.

3. The process of claim 1, wherein the at least one dihydric phenol compound represented by formula (I) or (II) is selected from the group consisting of 4,4'-dihydroxydiphenyl, 2,2-bis(4-hydroxyphenyl)-propane (bisphenol A), 2,4-bis(4-hydroxyphenyl)-2-methylbutane, 1,1-bis(4-hydroxyphenyl)-cyclohexane, α,α'-bis(4-hydroxyphenyl)-p-diisopropylbenzene, 2,2-bis(3-methyl-4-hydroxyphenyl)-propane, 2,2-bis(3-chloro-4-hydroxyphenyl)-propane, bis(3,5-dimethyl-4-hydroxyphenyl)-methane, 2,2-bis(3,5-dimethyl-4-hydroxyphenyl)-propane, bis(4-hydroxyphenyl)sulfone, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-cyclohexane, α,α'-bis(3,5-dimethyl-4-hydroxyphenyl)-p-diisopropylbenzene, 2,2-bis(3,5-dichloro-4-hydroxyphenyl)-propane, and 2,2-bis(3,5-dibromo-4-hydroxyphenyl)-propane.

4. The process of claim 1, wherein the compound containing at least three functional groups is a compound selected from the group consisting of mellitic acid, trimellitic acid, trimellitic acid chloride, trimellitic acid anhydride, pyromellitic acid, resorcyclic acid, resorcinaldehyde, trimellitiltrichloride, derivatives of trihydroxyflavan, phloroglucin, and 2,6-dimethyl-2,4,6-tris(4'-oxyphenol)hepta-3-ene.

5. The process of claim 4, wherein the derivative of trihydroxyflavan is 2,4,4-trimethyl-2',4'-7-trihydroxyflavan.

6. The process of claim 2 wherein the degree of polymerization of the chloroformate group-containing polycarbonate oligomer is from 2 to 10.

7. The process of claim 3, wherein the at least one dihydricphenol compound is selected from the group consisting of 2,2-bis-(4-hydroxyphenyl)-propane, 2,2-bis(3,5-dimethyl-4-hydroxyphenyl)-propane, 2,2-bis(3,5-dichloro-4-hydroxyphenyl)-propane, 2,2-bis-(3,5-dibromo-4-hydroxyphenyl)-propane, and 1,1-bis(4-hydroxyphenyl)-cyclohexane.

8. The method of claim 1, wherein the reaction of said chloroformate group-containing oligomer with said aqueous alkaline solution containing a compound having at least three functional groups is conducted at a temperature of from 2° to 40° C. from between 10 minutes and three hours.

9. The method of claim 1, wherein the step of interfacial polycondensing said reaction product is conducted at a temperature of from 2° to 40° C., for between 10 minutes and six hours.

10. The method of claim 8, wherein the reaction of said oligomer and said aqueous alkaline solution is conducted in the presence of a tertiaryamine.

* * * * *